US008488263B2

(12) United States Patent
Shen

(10) Patent No.: US 8,488,263 B2
(45) Date of Patent: Jul. 16, 2013

(54) SOFT MIRROR STRUCTURE

(75) Inventor: Ein-Yiao Shen, Taipei (TW)

(73) Assignee: Chin-Yeh Co., Ltd., Taipei (TW)

( * ) Notice: Subject to any disclaimer, the term of this patent is extended or adjusted under 35 U.S.C. 154(b) by 219 days.

(21) Appl. No.: 13/048,180

(22) Filed: Mar. 15, 2011

(65) Prior Publication Data

US 2012/0176697 A1    Jul. 12, 2012

(30) Foreign Application Priority Data

Jan. 12, 2011    (TW) .............................. 100200625 U

(51) Int. Cl.
*G02B 5/08*    (2006.01)
(52) U.S. Cl.
USPC ......................................................... 359/884
(58) Field of Classification Search
USPC .................................................. 359/883, 884
See application file for complete search history.

(56) References Cited

U.S. PATENT DOCUMENTS

2011/0120527 A1*    5/2011    Huang et al. .................. 136/247

* cited by examiner

*Primary Examiner* — Euncha Cherry
(74) *Attorney, Agent, or Firm* — Ming Chow; Sinorica, LLC

(57) ABSTRACT

The soft mirror structure comprises a reflective material layer and a soft transparent material, wherein the reflective material layer is a coating material able to be plated and reflect light and the soft transparent material is disposed on the surface of the reflective material layer, the soft transparent material has the feature of bending to make the soft mirror structure be bendable, so that the soft mirror structure is convenient to be rolled up and cut. Further, a user is able to see reflected outside images through to the soft transparent material, therefore the soft mirror structure has the function of mirror. The soft mirror structure can be cut to different demand dimensions and rolled up for easily taking along. Hence, the soft mirror structure is then convenient to be used and processed.

20 Claims, 6 Drawing Sheets

SOFT MIRROR STRUCTURE

BACKGROUND OF THE INVENTION

1. Field of the Invention

The present invention generally relates to a soft mirror structure, more particularly to a mirror structure that is convenient to be rolled up and to proceed cutting procedures.

2. Description of the Prior Art

Nowadays, people always walk around mirrors whenever they are brushing teeth, washing clothes, etc. General mirror only has the function of reflecting objects, such as reflecting appearances by means of mirrors. Presently, producers make an improvement that is to reduce the mirror volume for easily carrying. Hence, users may keep their faces clean without the is limitations of locations, time, etc. The manufacturing procedures of the mirror with smaller volume are listed below:

1. Glass-wash: The two surfaces of a glass, which is cut to demand dimensions already, are washed firstly. Then powder ferric oxide with water shall be brushed on a surface that is to be plated, mopped and cleaned by water while in dry. The surface to be plated is thus mopped and washed by a little tetrachloride, and then the residue that is stannous chloride may be washed by water. At last, the glass shall be washed by clean water.
2. Silver-coating: The washed glass may be disposed on a horizontal wooden frame or a horizontal wooden strip. A certain amount of silver liquid (argyrols) and another certain amount of reduction liquid can be stirred averagely and poured onto the washed glass. One noted thing is that the stirred liquid poured onto the glass may not be leaked from the glass. While a silver mirror is gradually appeared, the residue stirred liquid can be disregarded. Continuously, the glass can be washed by water and poured by gelatose for curing. After curing, brushing a layer of deep-red primer or antirust primer on the glass can be done.

According to above descriptions, mirrors are mostly coated by a layer of silver, and the glass of a mirror is not only that the hardness thereof is harder than other objects, but also is that the fragility is worse than others. Hence, while a production is made, the cutting procedures will be difficult to proceed. On the other hand, choosing glass to be a material for mirror shall produce a heavier mirror, which is thicker and is not easily to carry. As a matter of fact, small mirrors or different shapes of mirrors are manufactured to fit in with various applications but with the difficulty of the cutting procedures. Therefore, a soft mirror structure is developed to be easily rolled up and to proceed cutting procedures; more, the soft mirror structure with the slim volume and light weight is convenient to be stored and carried.

Thereby, the soft mirror structure may be discussed hereinafter.

SUMMARY OF THE INVENTION

The main objective of the present invention is to provide a soft mirror structure, which is convenient to be rolled up and cut, and the soft mirror structure is slim to be stored and carried.

The second objective of the present invention is to provide the soft mirror structure, which bendable feature is to let the soft mirror structure be connected with different objects for broadening applications.

To reach above objectives, the soft mirror structure comprises a reflective material layer and a soft transparent material, wherein the reflective material layer is a coating material able to be plated and reflect light and the soft transparent material is disposed on the surface of the reflective material layer, the soft transparent material has the feature of bending to make the soft mirror structure be bendable, so that the soft mirror structure is convenient to be rolled up and cut. Further, a user is able to see reflected outside images through the soft transparent material, therefore the soft mirror structure has the function of mirror. The soft mirror structure can be cut to different demand dimensions and rolled up for easily taking along. Hence, the soft mirror structure is then convenient to be used and processed.

Other and further features, advantages, and benefits of the invention will become apparent in the following description taken in conjunction with the following drawings. It is to be understood that the foregoing general description and following detailed description are exemplary and explanatory but are not to be restrictive of the invention. The accompanying drawings are incorporated in and constitute a part of this application and, together with the description, serve to explain the principles of the invention in general terms. Like numerals refer to like parts throughout the disclosure.

BRIEF DESCRIPTION OF THE DRAWINGS

The objects, spirits, and advantages of the preferred embodiments of the present invention will be readily understood by the accompanying drawings and detailed descriptions, wherein.

DETAILED DESCRIPTION OF THE INVENTION

Following preferred embodiments and figures will be described in detail so as to achieve aforesaid objects.

Figure 1:
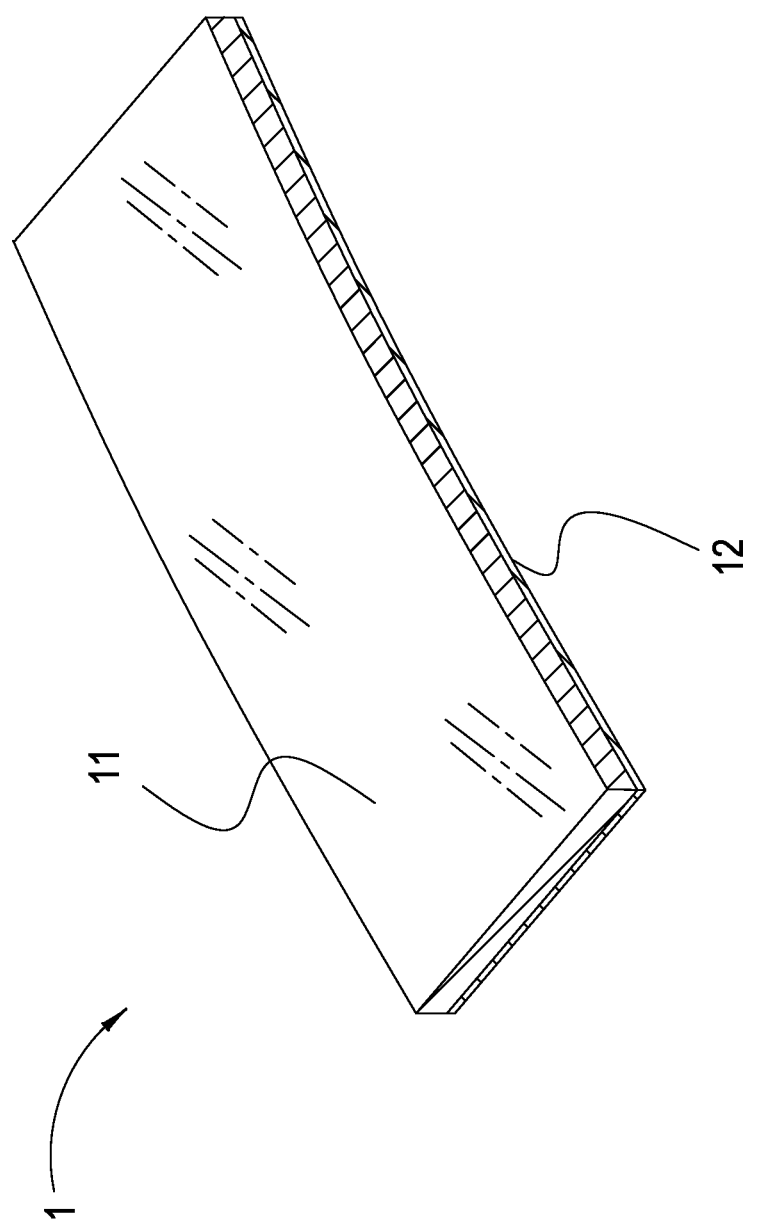
FIG. 1 illustrates a schematic 3-D view of a preferred embodiment of the soft mirror structure of the present invention.
Figure 2:
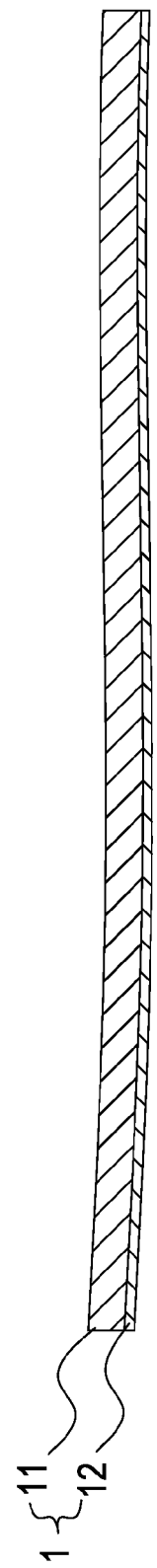
FIG. 2 illustrates a schematic sectional view of the preferred embodiment of the soft mirror structure of the present invention.

With references to FIG. 1 and FIG. 2, which illustrate a schematic 3-D view of a preferred embodiment of the soft mirror structure of the present invention and a schematic sectional view of the preferred embodiment of the soft mirror structure of the present invention. As shown in the figures, soft mirror structure 1 includes: a soft transparent material 11, which is disposed on the surface of the reflective material layer 12 and with transparency in order to reflect outside images; and a reflective material layer 12, which is a coating material able to be plated and reflect light in order to let the soft mirror structure 1 be with the function of mirror. Besides, the soft transparent material 11 makes the soft mirror structure 1 be bendable, so that the soft mirror structure 1 can be cut to different demand dimensions and rolled up for easily taking along. Hence, the soft mirror structure is then convenient to be used and processed.

Preferably, the reflective material layer 12 is a silver-coated layer and disposed on the soft transparent material 11 as a silver mirror layer.

Preferably, the reflective material layer 12 is a copper-coated layer and disposed on the soft transparent material 11 as a copper mirror layer.

Preferably, the reflective material layer 12 is an alloy-coated layer and disposed on the soft transparent material 11 as an alloy mirror layer.

Preferably, the reflective material layer 12 is an alloy-coated layer and disposed on the soft transparent material 11 as an alloy mirror layer.

Preferably, the reflective material layer 12 is a chemical-fusion-coated layer and disposed on the soft transparent material 11 as a chemical fusion mirror layer.

Preferably, the reflective material layer 12 is a metal-fusion-coated layer and disposed on the soft transparent material 11 as a metal fusion mirror layer.

Preferably, the soft transparent material 11 is selected from the group consisted of transparent plastic member, non-torn paper, cloth, and soft plastic.

Preferably, the soft plastic is made of polyethylene terephthalate (PET).

Preferably, the soft plastic is made of polyethylene Naphthalate (PEN).

Preferably, the soft plastic is made of polyvinylchloride (PVC).

Preferably, the soft plastic is made of polyimide (PI).

Preferably, the soft plastic is made of polypropylene (PP).

Figure 3:
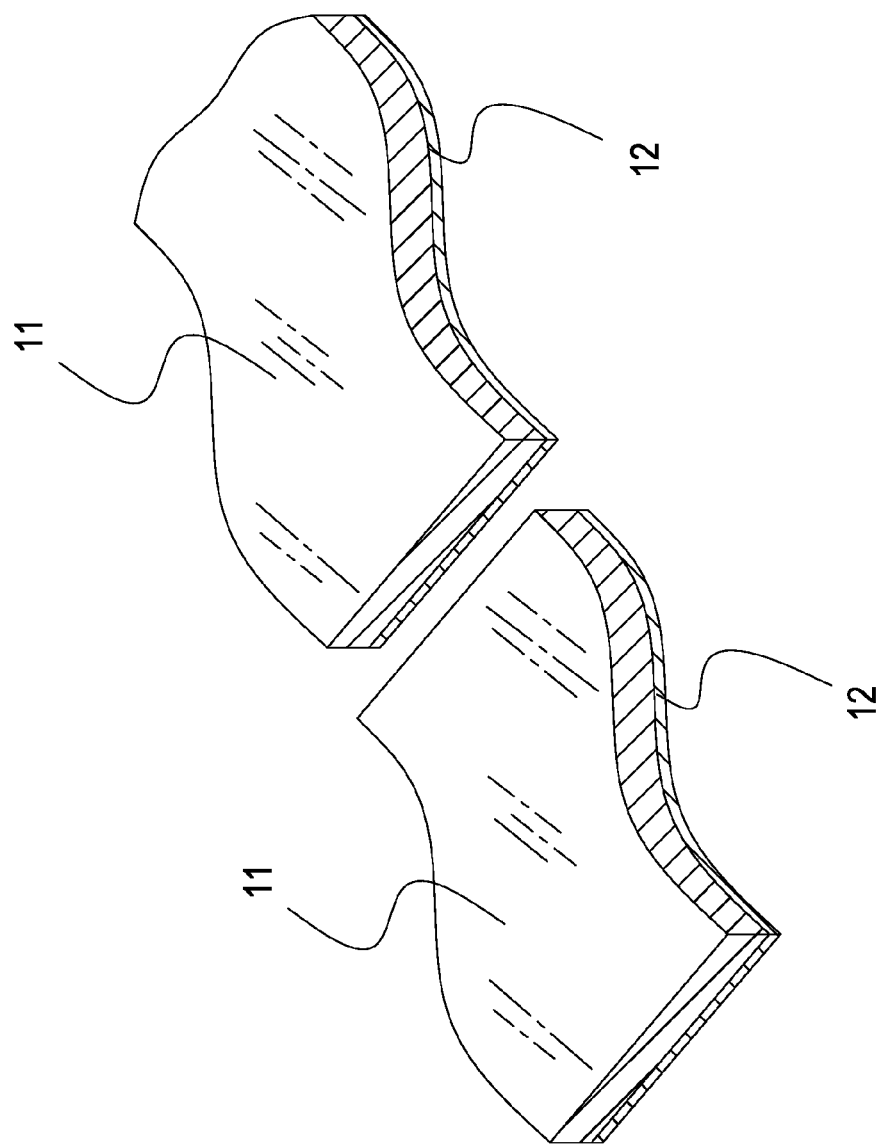
FIG. 3 illustrates a schematic view of cutting the preferred embodiment of the soft mirror structure of the present invention.

With reference to FIG. 3, which illustrates a schematic view of cutting the preferred embodiment of the soft mirror structure of the present invention. As shown in the figure, the soft transparent material 11 of the soft mirror structure 1 has the features of being bendable, unbreakable, non-fragile, slim, easy to carry, etc. Therefore different cutting ways are convenient to be proceeded after the reflective material layer 12 is attached to the soft transparent material 11. Since the feature of non-fragile, following cutting procedures are able to avoid unpredicted damage and loss after mirror products are made.

Figure 4:
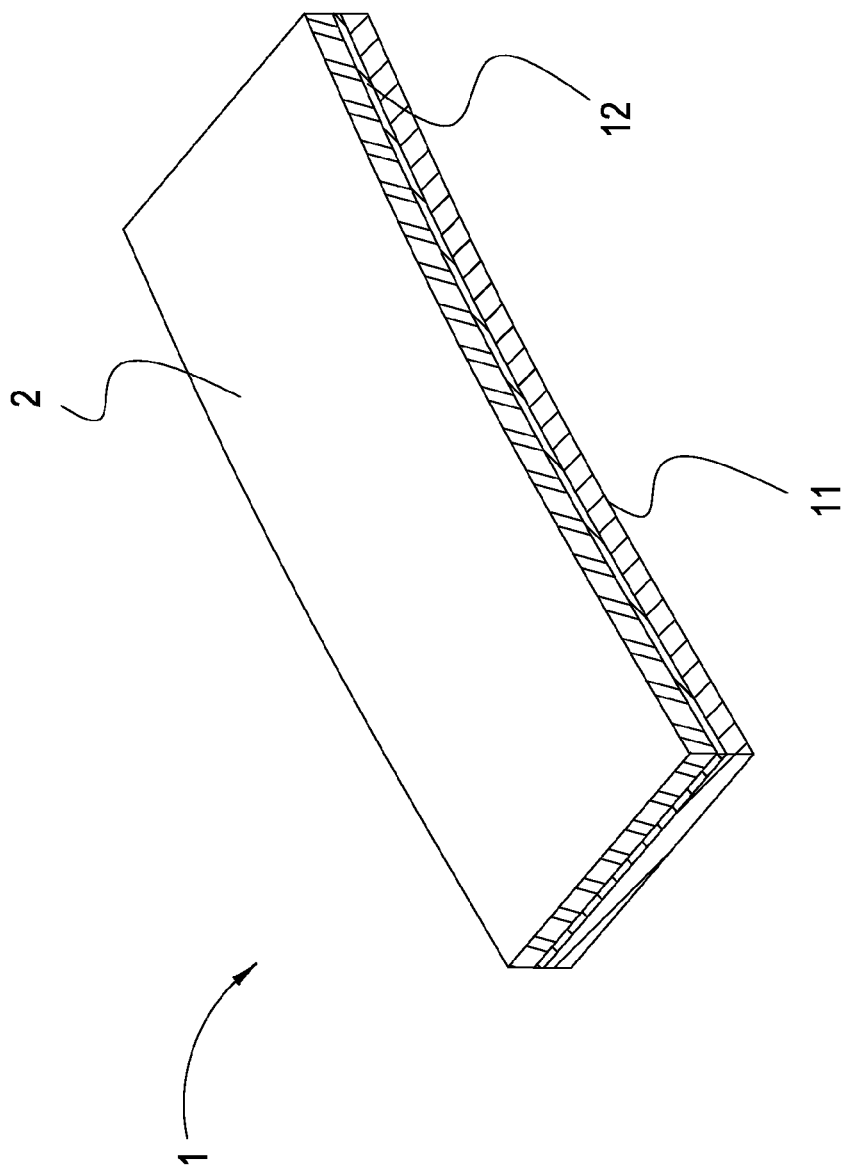
FIG. 4 illustrates a schematic 3-D view of a second preferred embodiment of the soft mirror structure of the present invention and FIG. 5 illustrates a schematic sectional view of the second preferred embodiment of the soft mirror structure of the present invention.
Figure 5:
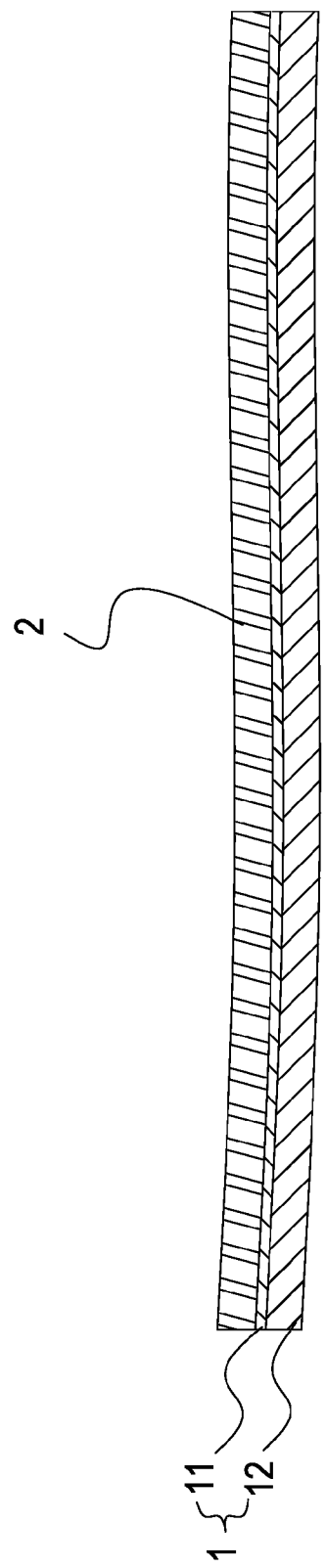

With references to FIG. 4 and FIG. 5, which illustrate a schematic 3-D view of a second preferred embodiment of the soft mirror structure of the present invention and a schematic sectional view of the second preferred embodiment of the soft mirror structure of the present invention. As shown in the figures, the difference between the present preferred embodiment and the aforesaid preferred embodiment is that the surface of the reflective material layer 12 is connected with the soft transparent material 11 and the other surface of the reflective material layer 12 is additionally connected with a soft cushion structure 2, wherein the soft cushion structure 2 is made of soft material so as to increase the friction force of the bottom surface of the soft mirror structure 1 for convenient operations.

Figure 6:
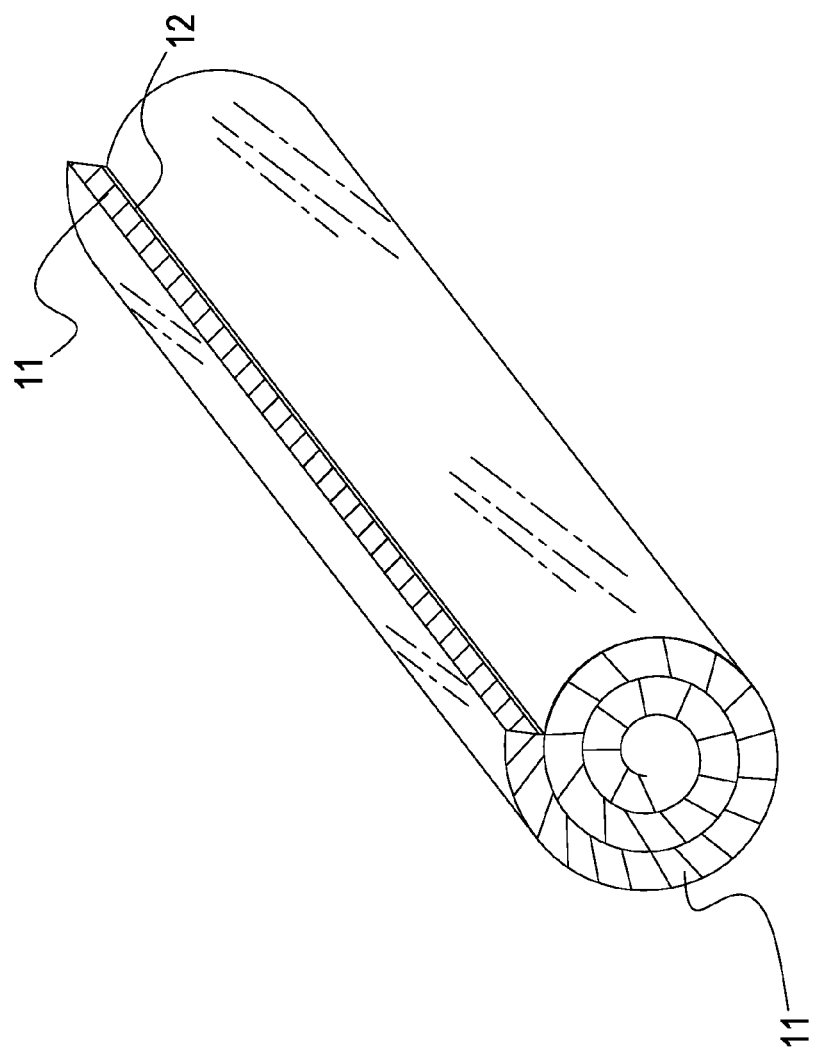
FIG. 6 illustrates a schematic operation view of the soft mirror structure of the present invention.

With reference to FIG. 6, which illustrates a schematic operation view of the soft mirror structure of the present invention. As shown in the figure, due to that of the soft transparent material 11 of the soft mirror structure having the features of being bendable, unbreakable, non-fragile, slim, easy to carry, etc., the soft mirror structure 1 can be rolled up. Further, the soft mirror structure 1 is capable of connecting with the surface of any member or structure. Therefore, a user is able to see the reflected image of himself through the soft transparent material 11 of the soft mirror structure 1. If the soft mirror structure 1 is fall down, it will not like a traditional mirror being damaged piece by piece. So that, the soft mirror structure 1 is able to avoid unnecessary hurt while in a user careless in order to highly increase safety.

With the comparison to prior arts, the soft mirror structure of the present invention has the advantages listed below:

1. The present invention is easily rolled up and engaged in cutting procedures, and it is slim to be stored and carried. Further, the soft mirror structure is with a bendable feature so as to let the soft mirror structure be connected with different objects for broadening applications.
2. The present invention has the features of being bendable, unbreakable, non-fragile, slim, easy to carry, etc. Thus, while a manufacture proceeds a cutting procedure to a mirror structure that is coated with silver, the cutting procedure is easily made, and the surface of the mirror structure may not be damaged by the cutting forces.
3. The present invention has the features of being bendable, unbreakable, non-fragile, slim, easy to carry, etc. Thus, The present invention is directly rolled up by user for storing and carrying. Besides, in case of user careless, the soft mirror structure is fall down to the ground, and the surface of the mirror structure or the whole soft mirror structure may not be easily damaged.

Although the invention has been disclosed and illustrated with reference to particular embodiments, the principles involved are susceptible for use in numerous other embodiments that will be apparent to persons skilled in the art. This invention is, therefore, to be limited only as indicated by the scope of the appended claims

What is claimed is:

1. A soft mirror structure comprising:
    a soft transparent layer made of a soft transparent material and having a first flat surface and a second flat surface;
    a reflective material layer made of a coating material and disposed on the second flat surface of the soft transparent layer to reflect outside images; and
    the soft transparent material is selected from the group consisted of transparent plastic member, non-torn paper, cloth, and soft plastic.

2. The soft mirror structure according to claim 1, wherein the reflective material layer is a silver-coated layer and disposed on the soft transparent material as a silver mirror layer.

3. The soft mirror structure according to claim 1, wherein the reflective material layer is a copper-coated layer and disposed on the soft transparent material as a copper mirror layer.

4. The soft mirror structure according to claim 1, wherein the reflective material layer is an alloy-coated layer and disposed on the soft transparent material as an alloy mirror la 5. The soft mirror structure according to claim 1, wherein the reflective material layer is a chemical-fusion-coated layer and disposed on the soft transparent material as a chemical fusion mirror layer.

6. The soft mirror structure according to claim 1, wherein the reflective material layer is a metal-fusion-coated layer and disposed on the soft transparent material as a metal fusion mirror layer.

7. The soft mirror structure according to claim 1, wherein the soft plastic is made of polyethylene terephthalate (PET).

8. The soft mirror structure according to claim 1, wherein the soft plastic is made of polyvinylchloride (PVC).

9. The soft mirror structure according to claim 1, wherein the soft plastic is made of polyimide.

10. The soft mirror structure according to claim 1, wherein the soft plastic is made of polypropylene.

11. A soft mirror structure comprising:
    a soft transparent layer made of soft transparent material and having a first flat surface and a second flat surface;

a reflective material layer made of a coating material and having a first flat surface and a second flat surface, and the first flat surface of the reflective material layer disposed on the second flat surface of the soft transparent layer to reflect outside images;

a soft cushion layer having a first flat surface and a second flat surface, and the first flat surface of the soft cushion disposed on the second surface of the reflective material layer;

the soft transparent material is selected from the group consisted of transparent plastic member, non-torn paper, cloth, and soft plastic; and the soft cushion layer is made of soft material.

12. The soft mirror structure according to claim 11, wherein the reflective material layer is a silver-coated layer and disposed on the soft transparent material as a silver mirror layer.

13. The soft mirror structure according to claim 11, wherein the reflective material layer is a copper-coated layer and disposed on the soft transparent material as a copper mirror layer.

14. The soft mirror structure according to claim 11, wherein the reflective material layer is an alloy-coated layer and disposed on the soft transparent material as an alloy mirror layer.

15. The soft mirror structure 1 according to claim 11, wherein the reflective material layer is a chemical-fusion-coated layer and disposed on the soft transparent material as a chemical fusion mirror layer.

16. The soft mirror structure according to claim 11, wherein the reflective material layer is a metal-fusion-coated layer and disposed on the soft transparent material as a metal fusion mirror layer.

17. The soft mirror structure according to claim 11, wherein the soft plastic is made of polyethylene terephthalate (PET).

18. The soft mirror structure according to claim 11, wherein the soft plastic is made of polyvinylchloride (PVC).

19. The soft mirror structure according to claim 11, wherein the soft plastic is made of polyimide.

20. The soft mirror structure according to claim 11, wherein the soft plastic is made of polypropylene.

* * * * *